United States Patent
Suzuki et al.

(10) Patent No.: US 11,533,016 B2
(45) Date of Patent: Dec. 20, 2022

(54) MOTOR DRIVING DEVICE AND STEERING SYSTEM

(71) Applicant: DENSO CORPORATION, Kariya (JP)

(72) Inventors: Haruo Suzuki, Kariya (JP); Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 16/509,927

(22) Filed: Jul. 12, 2019

(65) Prior Publication Data

US 2020/0028463 A1 Jan. 23, 2020

(30) Foreign Application Priority Data

Jul. 17, 2018 (JP) .............................. JP2018-134400

(51) Int. Cl.

| | | |
|---|---|---|
| *H02P 27/08* | (2006.01) | |
| *H02P 25/08* | (2016.01) | |
| *H02P 29/028* | (2016.01) | |
| *B62D 5/04* | (2006.01) | |
| *H02P 27/06* | (2006.01) | |
| *H02P 25/22* | (2006.01) | |

(52) U.S. Cl.
CPC ............ *H02P 29/028* (2013.01); *B62D 5/046* (2013.01); *H02P 25/22* (2013.01); *H02P 27/06* (2013.01)

(58) Field of Classification Search
CPC ............... H02P 27/06; H02P 3/18; H02P 6/20
See application file for complete search history.

(56) References Cited

U.S. PATENT DOCUMENTS

| | | | |
|---|---|---|---|
| 2010/0231154 A1 | 9/2010 | Kamata et al. | |
| 2011/0285335 A1* | 11/2011 | Tada ....................... | H02M 1/32 318/400.22 |
| 2012/0175953 A1* | 7/2012 | Ohkawa .................. | B60L 58/14 307/18 |
| 2014/0055059 A1 | 2/2014 | Uryu et al. | |
| 2016/0200355 A1* | 7/2016 | Mori ..................... | H02H 7/0844 180/446 |

FOREIGN PATENT DOCUMENTS

| | | |
|---|---|---|
| JP | 2009-261067 A | 11/2009 |
| JP | 2010-213523 A | 9/2010 |

* cited by examiner

*Primary Examiner* — Bickey Dhakal
*Assistant Examiner* — Charles S Laughlin
(74) *Attorney, Agent, or Firm* — Maschoff Brennan

(57) ABSTRACT

A control unit determines a presence or absence of a short-circuit failure with respect to a target switch which is a phase-opening switch to be determined. At this time, after opening all the phase opening switches, the control unit drives an inverter to connect a power supply line provided with the target switch among the phase opening switches to ground. The control unit determines that the target switch has a short-circuit failure when a voltage of the power supply line in which the target switch is not provided is smaller than a predetermined voltage.

12 Claims, 7 Drawing Sheets

|  | U1-PHASE LOWER ARM SW: ON | | V1-PHASE LOWER ARM SW: ON | | W1-PHASE LOWER ARM SW: ON | |
|---|---|---|---|---|---|---|
|  | NORMAL | SHORT-CIRCUIT FAILURE | NORMAL | SHORT-CIRCUIT FAILURE | NORMAL | SHORT-CIRCUIT FAILURE |
| L1 | VL | VL | Vin | VL | Vin | VL |
| L2 | Vin | VL | VL | VL | Vin | VL |
| L3 | Vin | VL | Vin | VL | VL | VL |

FIG. 3B

|  | U2-PHASE LOWER ARM SW: ON | | V2-PHASE LOWER ARM SW: ON | | W2-PHASE LOWER ARM SW: ON | |
|---|---|---|---|---|---|---|
|  | NORMAL | SHORT-CIRCUIT FAILURE | NORMAL | SHORT-CIRCUIT FAILURE | NORMAL | SHORT-CIRCUIT FAILURE |
| L4 | VL | VL | Vin | VL | Vin | VL |
| L5 | Vin | VL | VL | VL | Vin | VL |
| L6 | Vin | VL | Vin | VL | VL | VL |

MOTOR DRIVING DEVICE AND STEERING SYSTEM

CROSS REFERENCE TO RELATED APPLICATION

The present application is based on Japanese Patent Application No. 2018-134400 filed on Jul. 17, 2018, the entire contents of which are incorporated herein by reference.

FIELD

The present disclosure relates to a driving device for driving a motor and a steering system using the motor driving device.

BACKGROUND

A conventional motor driving device includes an inverter and a phase opening switch. The inverter selectively supplies each phase of a motor with a voltage. The phase opening switch suppresses regenerative current from flowing in each phase during a period of power supply from the inverter to each phase. The phase opening switch is provided in a power supply line connecting each phase of the motor and the inverter thereby to switch over power supply between the inverter and each phase of the motor. The phase opening switch includes a parasitic diode that allows current to flow between the motor and the inverter even in its open state.

SUMMARY

A motor driving device according to the present disclosure has a short-circuit determination unit which determines a presence or absence of a short-circuit failure of a phase opening switch, which is provided between an inverter and a motor and subjected to a short-circuit failure determination as a target switch. The short-circuit determination unit drives all phase opening switches to open, then drives the inverter to connect a power supply line including the target switch to a ground, and determine that the target switch has the short-circuit failure in case that a voltage of other power supply lines is lower than a predetermined voltage.

EMBODIMENT

First Embodiment

A steering system according to a present embodiment will be described with reference to the accompanying drawings. The steering system is provided in a vehicle to change a direction of road wheels according to a steering operation of a driver by a driving force of a motor.

Figure 1:
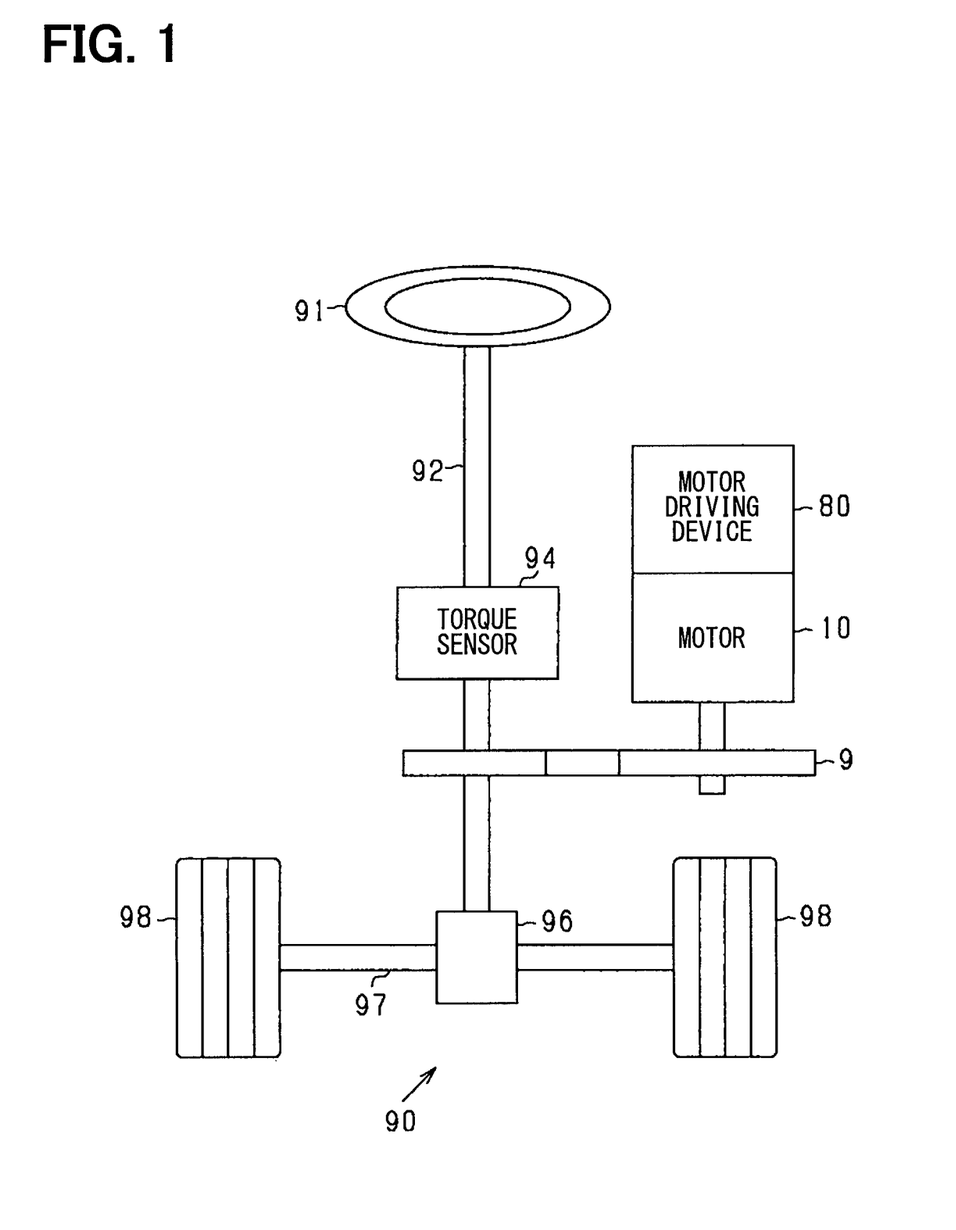
FIG. 1 is a schematic diagram of a steering system.

FIG. 1 shows an overall configuration of a steering system, which is indicated with a reference numeral 90. The steering system 90 includes a steering wheel 91 of a vehicle, a steering shaft 92, a pinion gear 96, a rack shaft 97, and a pair of road wheels 98.

The steering shaft 92 is connected to the steering wheel 91 and provided with a torque sensor 94 for detecting a steering torque. The torque sensor 94 converts a torque accompanying rotation of the steering shaft 92 into a voltage and outputs it. The pinion gear 96 is provided at an end of the steering shaft 92 and engaged with the rack shaft 97. The pair of road wheels 98 is coupled to ends of the rack shaft 97 via a tie rod or the like.

When a driver of the vehicle rotates the steering wheel 91, the steering shaft 92 connected to the steering wheel 91 rotates. A rotational motion of the steering shaft 92 is converted into a linear motion of the rack shaft 97 by the pinion gear 96 and the pair of road wheels 98 is steered to an angle corresponding to a displacement amount of the rack shaft 97.

The steering system 90 includes a motor 10 for generating steering assist torque to the steering shaft 92, a motor driving device 80 for driving the motor 10, and a reduction gear 9 for reducing the rotation of a rotation shaft of the motor 10 and transmitting reduced rotation to the steering shaft 92.

Figure 2:
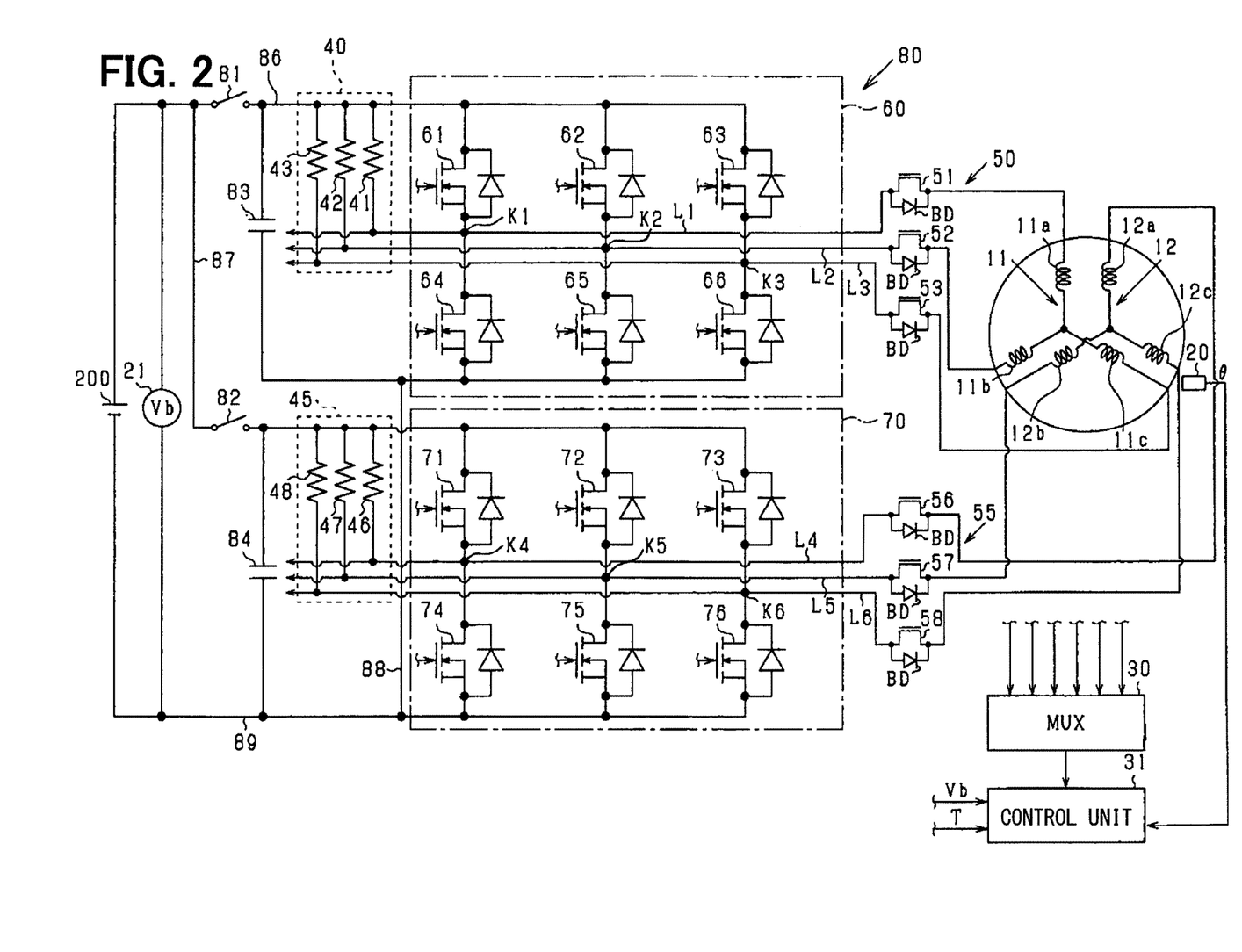
FIG. 2 is a circuit diagram of a motor and a motor driving device.

As shown in FIG. 2, the motor 10 is a multi-winding motor including a first phase coil group 11 of three phase (U, V, W) coils and a second phase coil group 12 of three phase coils. The motor 10 has a rotor and a stator (not shown). The first phase coil group 11 includes a U1 phase coil 11a, a V1 phase coil 11b and a W1 phase coil 11c. The U1, V1 and W1 phase coils 11a, 11b and 11c are connected to each other electrically at a neutral point. The second phase coil group 11 includes a U2 phase coil 12a, a V2 phase coil 12b and a W2 phase coil 12c. The U2, V2 and W2 phase coils 12a, 12b and 12c are connected to each other electrically at a neutral point.

The first phase coil group 11 and the second phase coil group 12 are electrically independent and wound around the same stator to be magnetically coupled by a magnetic circuit of the motor 10. In the present embodiment, the U1 phase coil 11a of the first phase coil group 11 and the U2 phase coil 12a of the second phase coil group 12 are provided at positions shifted in phase by 30°. This arrangement is the same for the V phase and the W phase. An angle sensor 20 is attached to the motor 10 to detect a rotational angle of the rotor.

The motor driving device 80 is provided between a storage battery 200 as a DC power supply and the motor 10, converts a DC inter-terminal voltage Vb supplied from the battery 200 into a three-phase AC voltage and supplies it to each phase of the motor 10.

The motor driving device 80 mainly includes a first inverter 60, a second inverter 70, phase-opening switches 51, 52, 53, 56, 57, 58, a first pull-up resistor unit 40 and a second pull-up resistor unit 45. The first inverter 60 supplies the three-phase AC voltage to the first phase coil group 11 of the motor 10. The second inverter 70 supplies three-phase AC voltage to the second phase coil group 12 of the motor 70.

The first inverter 60 is connected to a positive electrode terminal of the battery 200 via a first upper side bus 86, which is a high-potential side bus, and is connected to a negative electrode terminal of the battery 200 via a first lower side bus 88, which is a low-potential side bus. The first inverter 60 is configured as a full bridge circuit having six semiconductor switches 61 to 66. Each of the switches 61 to 66 in the present embodiment is formed of a MOSFET.

Sources of upper arm switches 61, 62 and 63, which are high-potential side switches functioning as upper arms of the U1, V1 and W1 phases, are connected to drains of lower arm switches 64, 65 and 66, which are low-potential side switches functioning as lower arms of the U1, V1 and W1 phases, respectively. Drains of the upper arm switches 61 to 63 are connected to the first upper side bus bar 86. Sources of the lower arm switches 64, 65 and 66 are connected to the first lower side bus bar 88.

A first connection point K1 between the upper arm switch 61 and the lower arm switch 64 is connected to the U1-phase coil 11a via a first power supply line L1. A second connection point K2 between the upper arm switch 62 and the lower arm switch 65 is connected to the V1-phase coil 11b via a second power supply line L2. A third connection point K3 between the upper arm switch 63 and the lower arm switch 66 is connected to the W1-phase coil 11c via a third power supply line L3.

The second inverter 70 is connected to the positive electrode terminal of the battery 200 via a second upper side bus 87, which is a high-potential side bus, and is connected to the negative electrode terminal of the battery 200 via a second lower side bus 88, which is a low-potential side bus. The second inverter 70 is also configured as a full bridge circuit having six semiconductor switches 71 to 76. Each of the switches 71 to 76 in the present embodiment is also formed of a MOSFET.

Sources of upper arm switches 71, 72 and 73, which are high-potential side switches functioning as upper arms of the U2, V2 and W2 phases, are connected to drains of lower arm switches 74, 75 and 76, which are low-potential side switches functioning as lower arms of the U2, V2 and W2 phases, respectively. Drains of the upper arm switches 71 to 73 are connected to the second upper side bus bar 87. Sources of the lower arm switches 74, 75 and 76 are connected to the second lower side bus bar 89.

A fourth connection point K4 between the upper arm switch 71 and the lower arm switch 74 is connected to the U2-phase coil 12a via a fourth power supply line L4. A fifth connection point K5 between the upper arm switch 72 and the lower arm switch 75 is connected to the V2-phase coil 12b via a fifth power supply line L5. A sixth connection point K6 between the upper arm switch 73 and the lower arm switch 76 is connected to the W2-phase coil 12c via a sixth power supply line L6.

U1, V1 and W1-phase opening switches 51, 52 and 53 are turned off, that is, opened, during a period in which electric power to the motor 10 is not supplied by the first inverter 60. As a result, electrical connection between the first phase coil group 11 and the first inverter 60 through the power supply lines L1, L2 and L3 is interrupted. The U1-phase opening switch 51 is provided in the first power supply line L1. The V1-phase opening switch 52 is provided in the second power supply line L2. The W1-phase opening switch 53 is provided in the third power supply line L3. Hereinafter, the U1, V1 and W1-phase opening switches 51, 52 and 53 are also referred to as a first switch group 50.

U2, V2 and W2-phase opening switches 56, 57 and 58 are opened during a period in which the electric power to the motor 10 is not supplied by the second inverter 70. As a result, electrical connection between the second phase coil group 11 and the second inverter 70 through the power supply lines L4, L5 and L6 is interrupted. The U2-phase opening switch 56 is provided in the fourth power supply line L4. The V2-phase opening switch 57 is provided in the fifth power supply line L2. The W2-phase opening switch 58 is provided in the sixth power supply line L3. Hereinafter, the U2, V2 and W2-phase opening switches 56, 57 and 58 are also referred to as a second switch group 55.

In the present embodiment, the phase opening switches 51 to 53 and 56 to 58 of the first and second switch groups 50 and 55 are all formed of MOSFETs. The first switch group 50 is provided in the first to third power supply lines L1 to L3 such that the direction from the drain to the source is from the coils 11a to 11c of the motor 10 to the first to third connection points K1 to K3, respectively. The second switch group 55 is provided in the fourth to sixth power supply lines L4 to L6 such that the direction from the drain to the source is from the coils 12a to 12c of the motor 10 to the fourth to sixth connection points K4 to K6, respectively. In addition, the first and second switch groups 50 and 55 have parasitic diodes BD which allow current flow from the source to the drain even in the open state of each switch group.

The first pull-up resistor unit 40 always supplies an input voltage Vin corresponding to the inter-terminal voltage Vb of the battery 200 to the first to third power supply lines L1 to L3. The first pull-up resistor unit 40 includes resistive elements 41, 42 and 43. The resistive element 41 connects the first upper side bus 86 to the first power supply line L1. The resistive element 42 connects the first upper side bus 86 to the second power supply line L2. The resistive element 43 connects the first upper side bus 86 and the third power supply line L3.

The second pull-up resistor unit 40 always supplies the input voltage Vin corresponding to the inter-terminal voltage Vb of the battery 200 to the fourth to sixth power supply lines L4 to L6. The second pull-up resistor unit 45 includes resistive elements 46, 47 and 48. The resistive element 45 connects the second upper side bus 87 to the fourth power supply line L4. The resistive element 47 connects the second upper side bus 87 to the fifth power supply line L5. The resistive element 48 connects the second upper side bus 87 and the sixth power supply line L6.

In the first upper side bus 86, a first power supply relay 81 capable of conducting and interrupting the power supply from the battery 200 to the first inverter 60 is provided closer to the battery 200 than the connection point of the first inverter 60 is, that is, provided between the battery 200 and the first inverter 60. In the second upper side bus 87, a second power supply relay 81 capable of conducting and interrupting the power supply from the battery 200 to the second inverter 70 is provided closer to the battery 200 than the connection point of the second inverter 70 is, that is, provided between the battery 200 and the second inverter 70. In the present embodiment, the first and second power supply relays 81 and 82 are configured by any of semiconductor switches such as MOSFETs, IGBTs and thyristors, and mechanical relay switches.

The first upper side bus 86 and the first lower side bus 88 are connected through a first capacitor 83. The second upper side bus 87 and the second lower side bus 89 are connected through a second capacitor 84. A voltage sensor 21 is connected between the first upper side bus 86 and the second lower side bus 89. The voltage sensor 21 detects the inter-terminal voltage Vb across the terminals of the battery 200.

The motor driving device 80 includes a multiplexer (hereinafter, referred to as MUX) 30 and a control unit 31. In the present embodiment, the control unit 31 is configured by a microcomputer 31a. Various processes in the control unit 31 may be software processes of a program already stored in a tangible memory device such as a ROM and executed by a CPU of the microcomputer 31a, or may be hardware processes executed by special electronic circuits.

Input terminals of the multiplexer 30 are respectively connected to the power supply lines L1 to L6, and voltages of the power supply lines L1 to L6 are input to the input terminals. The voltage input through each input terminal is selected by a signal applied from the control unit 31 and is outputted to the control unit 31. The control unit 31 converts an analog voltage selectively outputted from the multiplexer (MUX) 30 into a digital value and stores the digital value in an internal register. In the present embodiment, the MUX 30 operates as an output switching unit, and the control unit 31 operates as a conversion unit. The MUX 30 and the control unit 31 operate jointly as a voltage detection unit.

The control unit 31 controls the switches 61 to 66 of the first inverter 60 and the switches 71 to 76 of the second inverter 70 based on the steering torque T acquired from the torque sensor 94 and the electrical angle θ acquired from the angle sensor 20 thereby to drive the motor 10 to generate a desired torque. Specifically, the control unit 31 outputs, to gates of the switches 61 to 66 and 71 to 77, operation signals for causing the switches 61 to 66 and 71 to 77 to turn off (open) or turn on (close).

The control unit 31 determines presence or absence of a short-circuit failure in the first switch group 50 and the second switch group 55 based on the voltages of the power supply lines L1 to L6 supplied via the MUX 30. In the present embodiment, the control unit 31 is configured to turn on the first and second power supply relays 81 and 82 by turning on an ignition switch of the vehicle, and then, during a predetermined period after activation of the steering system 90 has been established, determines whether any of the two switch groups 50 and 55 has the short-circuit failure.

Figure 3A:
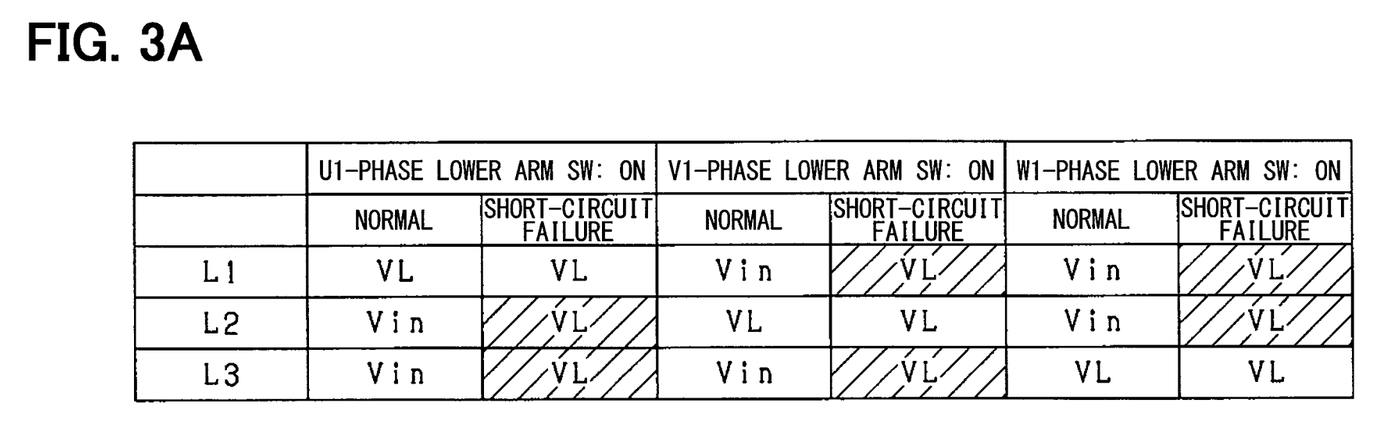
FIG. 3A and FIG. 3B are tables showing determination results of a presence or absence of a short-circuit failure.
Figure 3B:
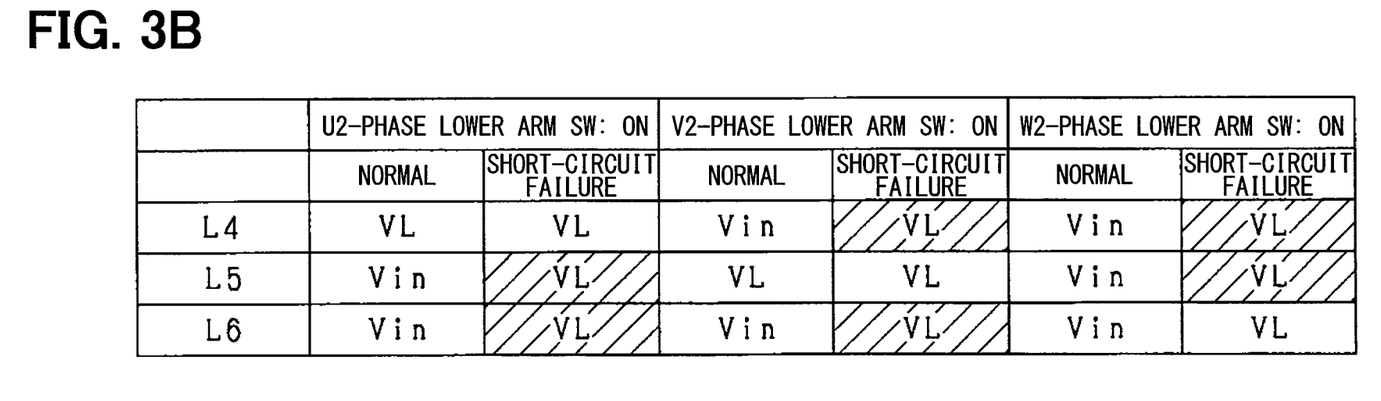

Next, a failure determination method for determining the presence or absence of a short-circuit failure of the first and second groups 50 and 55 according to the present embodiment will be described. FIG. 3A is a table showing a determination result of the presence or absence of a short-circuit failure with respect to the first switch group 50. FIG. 3B is a table showing a determination result of the presence or absence of a short-circuit failure with respect to the second switch group 55. In each of the tables shown in FIG. 3A and FIG. 3B, "Vin" and "VL" indicate states that the voltage of each of the power supply lines L1 to L3 is maintained at the input voltage Vin and is changed to be smaller than the input voltage Vin, respectively.

Figure 4A:
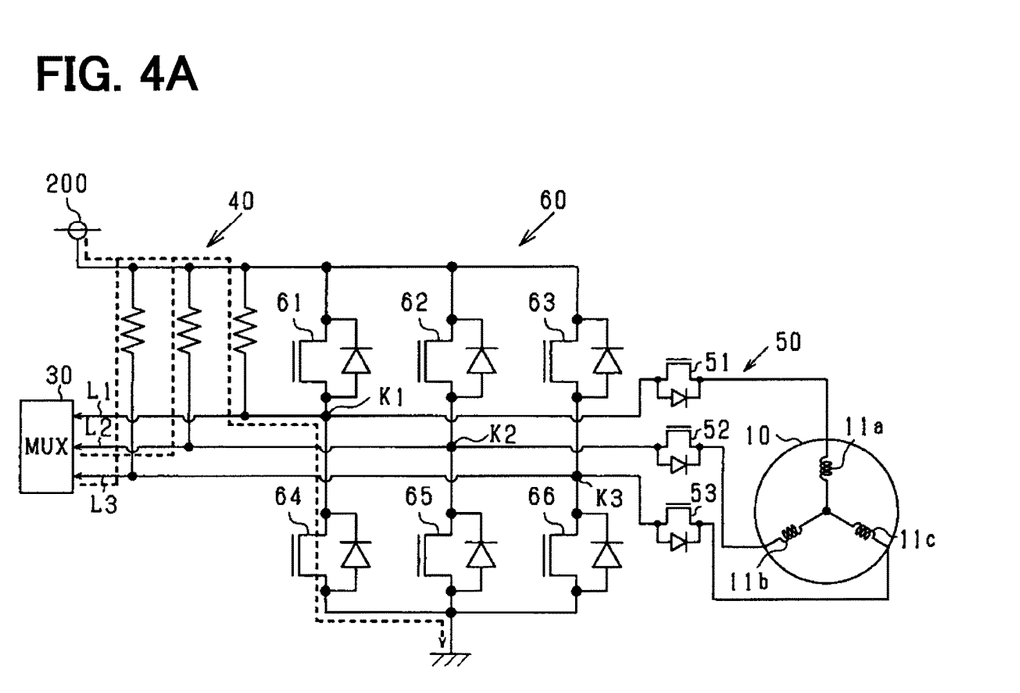
FIG. 4A and FIG. 4B are circuit diagrams showing current flow in case of an absence and presence of a short-circuit failure, respectively.
Figure 4B:
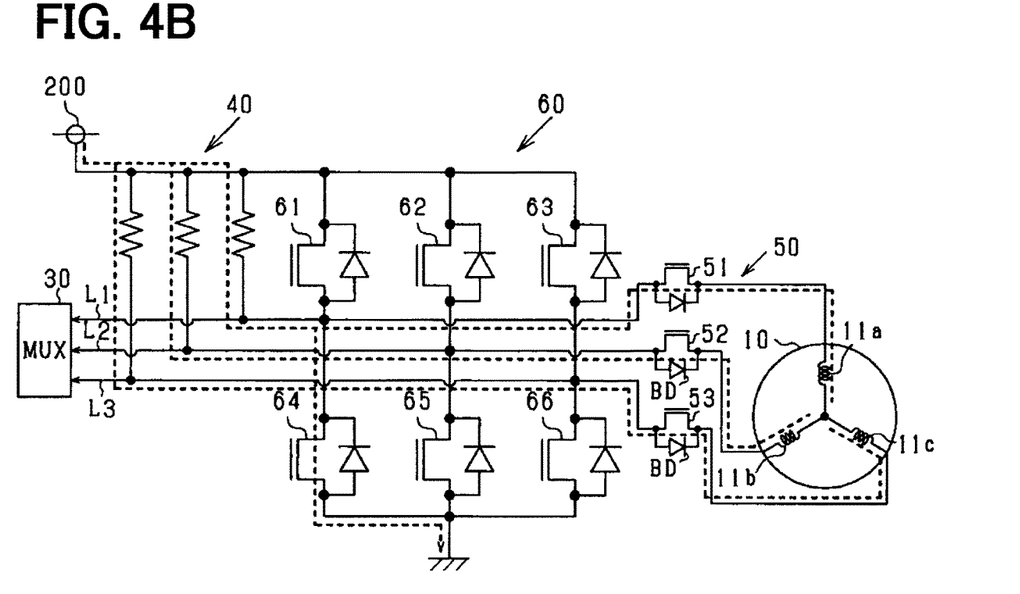

FIG. 4A and FIG. 4B are circuit diagrams for explaining the presence or absence of a short-circuit failure in an exemplary case of the U1-phase opening switch 51 in an execution of a short-circuit failure determination method shown in FIG. 3. FIG. 4A shows a case where no short-circuit failure is present in any of the phase opening switches 51 to 53 included in the first switch group 50. FIG. 4B shows a case where the U1-phase opening switch 51 has a short-circuit failure. In FIG. 4A and FIG. 4B, current flow paths are indicated with broken lines. Each phase opening switch, which is to be subjected to determining of the presence or absence of a short-circuit failure is also referred to as a target switch.

In case of determining the presence or absence of a short-circuit failure of the U1-phase opening switch 51, the control unit 31 first outputs an operation signal to turn off the first switch group 50, that is, the control unit 31 opens the first switch group 50. Next, the control unit 31 outputs an operation signal to turn on only the lower arm switch 64 of the U1 phase, that is, the control unit 31 closes only the lower arm switch 64 in the inverter 60, so that the first power supply line L1 provided with the U1-phase opening switch 51 which is the target switch is grounded via the lower arm switch 64. As a result, the first power supply line L1 is connected to the ground via the U1-phase lower arm switch 64, and the voltage of the first power supply line L1 falls from Vin to VL.

In this state, if the U1-phase opening switch 51 does not have a short-circuit failure, the second and third power supply lines L2 and L3 are not electrically connected to the first power supply line L1 as shown in FIG. 4A. Therefore, the input voltage Vin supplied from the battery 200 via the first pull-up resistor unit 40 continues to be supplied to the second and third power supply lines L2 and L3. The voltages of the second and third power supply lines L2 and L3 are maintained at the input voltage Vin.

On the other hand, if the U1-phase opening switch 51 has the short-circuit failure in the same state where the first switch group 50 is opened (turned off) and the lower arm switch 64 is closed, the voltages of the second and third power supply lines L2 and L3 change as follows. As shown in FIG. 4B, the first power supply line L1 is electrically connected to the second and third power supply lines L2 and L3 via the parasitic diodes BD of the V1 and W1-phase opening switches 52 and 53. As a result, the second and third power supply lines L2 and L3 are electrically connected to the ground. The voltages of the second and third power supply lines L2 and L3 fall from Vin to VL.

Therefore, by operating the MUX 30, the control unit 31 compares with a predetermined threshold value a detection voltage of at least either one of voltages Vv1 and Vw1 of the second and third power supply lines L2 and L3, in which the target switch is not provided. In the present embodiment, among the detection voltages of the power supply lines L1 to L6, the detection voltage of the power supply line in which the target switch is not provided is a determination target voltage. In case this detection voltage is smaller than the predetermined threshold value, the control unit 31 determines that the U1-phase opening switch 51 has the short-circuit failure.

In case of determining the presence or absence of a short-circuit failure of the V1-phase opening switch 52, the control unit 31 may close only the lower arm switch 65 of the V1 phase and determine whether the detection voltages Vu1 and Vw1 of the first and third power supply lines L1 and L3 in which the target switch (V1-phase opening switch 52) is not provided are lower than the predetermined threshold value. In case of determining the presence or absence of a short-circuit failure of the W1-phase opening switch 53, the control unit 31 may close only the lower arm switch 66 of the W1 phase and check whether the detection voltages Vu1 and Vv1 of the first and second power supply lines L1 and L2 in which the target switch (W1-phase opening switch 53) is not provided are lower than the predetermined threshold value. The presence or absence of a short-circuit failure of the second switch group 55 may be executed in the same procedure as determining the presence or absence of a short-circuit failure for the first switch group 50.

Figure 5:
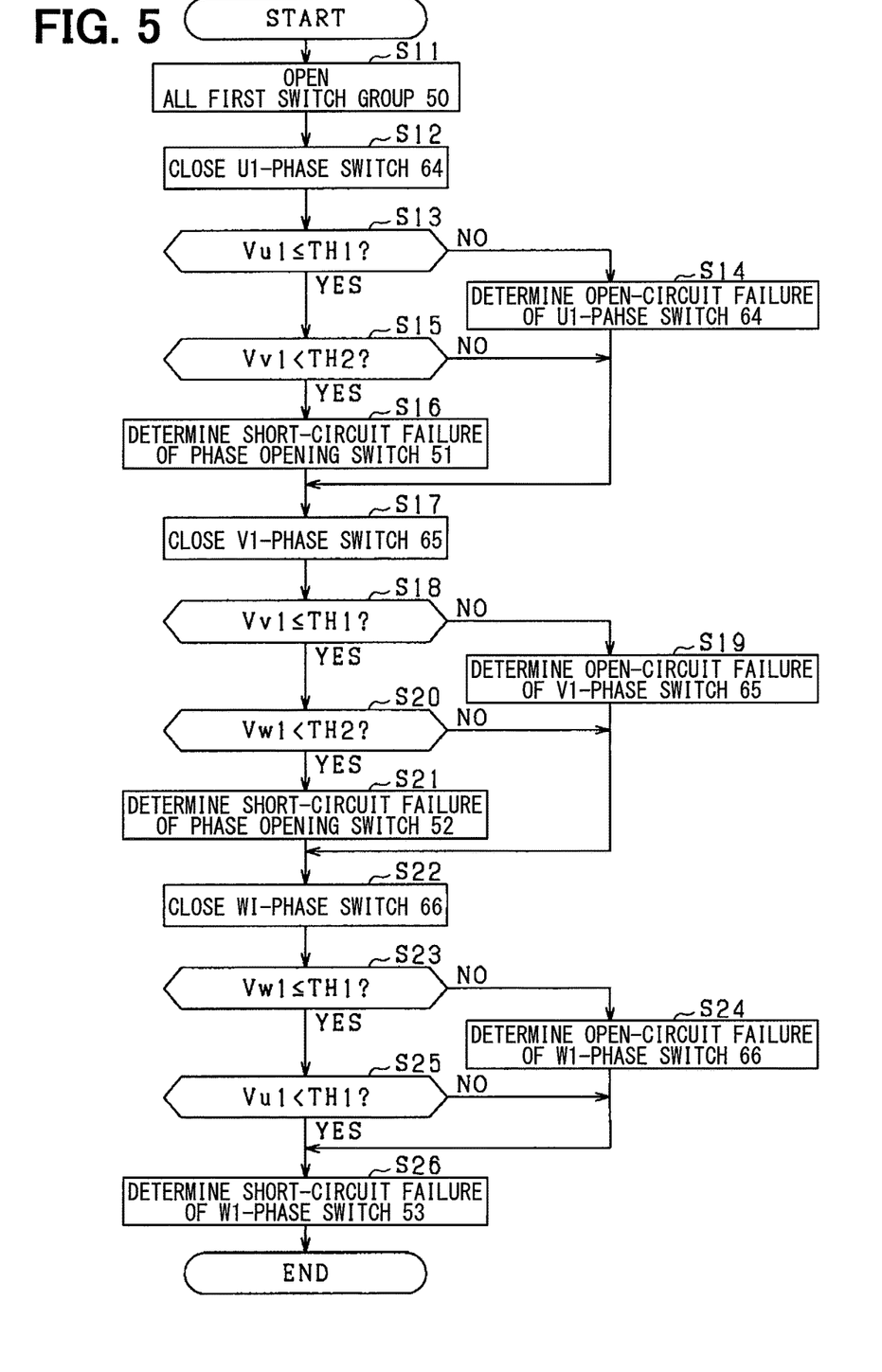
FIG. 5 is a flowchart showing a procedure of determining a short-circuit failure executed by a control unit according to a first embodiment.

Next, the determination procedure for determining the presence or absence of a short-circuit failure of the first switch group 50 executed by the control unit 31 will be described with reference to FIG. 5. The process shown in FIG. 5 is repeatedly executed by the control unit 31 in a predetermined cycle period. In the present embodiment, the control unit 31 is a microcomputer, which executes the software program corresponding to the flowchart shown in FIG. 5 and stored in a memory.

In step S11, all the phase opening 51 to 53 of the first switch group 50 are opened (turned off). In step S12, the U1-phase lower arm switch 64 is closed (turned on) while other lower arm switches 65 and 66 are opened (turned off). In case that the lower arm switches 64 to 66 used for determining the presence or absence of a short circuit failure have open-circuit failures such as electric disconnection, the power supply lines L1 to L3 provided with the target switches are not connected to the ground and hence the presence or absence of a short-circuit failure may not be determined correctly. Therefore, in the present embodiment, prior to the determination of the presence or absence of a short-circuit failure of each target switch, the presence or absence of an open-circuit failure of each lower arm switch 64 to 66 used for the determination of the presence or absence of a short-circuit failure is determined.

In step S13, the presence or absence of an open-circuit failure of the U1-phase lower arm switch 64 is determined based on whether the detection voltage Vu1 acquired by the MUX 30 is equal to or smaller than an open-circuit failure determination value TH1. If it is determined in step S13 that the detection voltage Vu1 is larger than the open-circuit failure determination value TH1, it is determined in step S14 that the U1-phase lower arm switch 64 has the open-circuit failure. Then the V1-phase opening switch 65 is closed in step S17 without determining the presence or absence of a short-circuit failure of the U1-phase opening switch 51. Steps S13 and S14 correspond to an open-circuit failure determination unit for the U1-phase lower arm switch 64. The open-circuit failure determination value TH1 is a value for determining the presence or absence of an open-circuit failure of the lower arm switch, and is set to a value of 0 or larger but smaller than the input voltage Vin. In the present embodiment, the open-circuit failure determination value TH1 is set to, for example, a value slightly larger than 0.

On the other hand, if it is determined that the detection voltage Vu1 is equal to or smaller than the open-circuit failure determination value TH1, step S15 is executed and the presence or absence of a short-circuit failure of the U1-phase opening switch 51 is determined. Specifically, in step S15, it is determined whether the detection voltage Vv1 acquired by the MUX 30 is smaller than the short-circuit failure determination value TH2. The short-circuit failure determination value TH2 is a value for determining the presence or absence of a short-circuit failure of each phase opening switch, and is set to a value smaller than the input voltage Vin and larger than 0.

If it is determined in step S15 that the detection voltage Vv1 is equal to or larger than the short-circuit failure determination value TH2, it is determined that the U1-phase opening switch 51 does not have the short-circuit failure. On the other hand, if it is determined that the detection voltage Vv1 is smaller than the short-circuit failure determination value TH2, step S16 is executed and the presence of a short-circuit failure of the U1-phase opening switch 51 is determined. Steps S15 and S16 correspond to a short-circuit determination unit that determines the presence or absence of a short-circuit failure of the U1-phase opening switch 51.

In step S17, the V1-phase lower arm switch 65 is closed. Further, the U1-phase lower arm switch 64 is opened.

In step S18, the presence or absence of an open-circuit failure of the V1-phase lower arm switch 65 is determined based on whether the detection voltage Vv1 acquired by the MUX 30 is equal to or smaller than the open-circuit failure determination value TH1. If it is determined that the detection voltage Vv1 is larger than the open-circuit failure determination value TH1, it is determined in step S19 that the V1-phase lower arm switch 65 has the open-circuit failure. Then the control unit 31 executes step S21 without determining the presence or absence of a short-circuit failure of the V1-phase opening switch 51. Steps S18 and S19 correspond to the open-circuit failure determination unit for the V1-phase lower arm switch 65.

If it is determined in step S18 that the detection voltage Vv1 is equal to or smaller than the open-circuit failure determination value TH1, step S20 is executed. Specifically, in step S20, it is determined whether the detection voltage Vw1 acquired by the MUX 30 is smaller than the short-circuit failure determination value TH2. If it is determined that the detection voltage Vw1 is equal to or larger than the short-circuit failure determination value TH2, step S22 is executed. On the other hand, if it is determined that the detection voltage Vw1 is smaller than the short-circuit failure determination value TH2, step S21 is executed and the presence of the short-circuit failure of the V1-phase opening switch 52 is determined. Steps S20 and S21 correspond to the short-circuit determination unit that determines the presence or absence of a short-circuit failure of the V1-phase opening switch 52.

In step S22, the W1-phase lower arm switch 66 is closed. Further, the V1-phase lower arm switch 64 is opened.

In step S23, the presence or absence of an open-circuit failure of the W1-phase lower arm switch 65 is determined based on whether the detection voltage Vw1 acquired by the MUX 30 is equal to or smaller than the open-circuit failure determination value TH1. If it is determined that the detection voltage Vvw is larger than the open-circuit failure determination value TH1, it is determined in step S24 that the W1-phase lower arm switch 66 has the open-circuit failure. Then, the series of processes shown in FIG. 5 is terminated. Steps S23 and S24 correspond to the open-circuit failure determination unit for the W1-phase lower arm switch 66.

If it is determined in step S23 that the detection voltage Vw1 is equal to or smaller than the open-circuit failure determination value TH1, step S25 is executed. Specifically, in step S25, it is determined whether the detection voltage Vu1 acquired by the MUX 30 is smaller than the short-circuit failure determination value TH2. If it is determined that the detection voltage Vu1 is equal to or larger than the short-circuit failure determination value TH2, the process shown in FIG. 5 is terminated. On the other hand, when it is determined that the detection voltage Vu1 is smaller than the short-circuit failure determination value TH2, step S26 is executed and the presence of the short-circuit failure of the W1-phase opening switch 52 is determined. Steps S25 and S26 correspond to the short-circuit determination unit that determines the presence or absence of a short-circuit failure of the W1-phase opening switch 53.

The first embodiment described above has the following effect in comparison to a conventional motor driving device, which determines whether a phase opening switch of each phase has a short-circuit failure.

In this conventional motor driving device, each power supply line is connected to a voltage detection unit via a voltage dividing circuit. For determining whether a phase opening switch of a specific phase has a short-circuit failure, an upper arm of an inverter is driven to supply a voltage to a phase opening switch, which is a target switch to be subjected to short-circuit determination, from a storage battery. In case that there is a short-circuit failure in the target switch, a power supply line connected to the target switch and a power supply line connected to another phase opening switch, which is not to the target switch, are electrically conducted via each phase of a motor and a parasitic diode. As a result, a voltage is supplied to the power supply line connected to the phase opening switch other than the target switch. The connected power supply line is conducted, and a voltage is applied to the power supply line connected to the phase opening switch other than the target switch. The motor driving device determines whether the short-circuit failure of the phase opening switch is present or absent based on a voltage value provided by dividing the voltage of the power supply line connected to the phase opening switch other than the target switch by a voltage circuit.

According to the conventional motor driving device described above, the voltage dividing circuit need be provided to check whether the phase opening switch has the short-circuit failure. For this reason, the voltage dividing circuit increases a physical size of the motor driving device.

In the present embodiment, the short-circuit failure is determined differently from the conventional motor driving device as described below. In case that the control unit 31 needs to determine the presence or absence of the first switch group 50, the control unit 31 causes all the phase opening switches 51 to 53 in the first switch group 50 to open and then operates the first inverter 60 to connect the power supply line provided with the target switch to ground. At this time, when the target switch has the short-circuit failure, the voltage of the power supply line in which the target switch is not provided has a value smaller than the input voltage Vin. In this case, the target switch can be determined as having the short-circuit failure by the voltage of each of the power supply lines L1 to L6 being decreased from the input voltage Vin. It is thus only necessary to use the pull-up resistor units 40 and 45 for determining whether the target switch has the short-circuit failure. As a result, a physical size of the motor driving device 80 can be reduced.

In the configuration in which the lower arm switches of the first and second inverters 60 and 70 are closed to determine the presence or absence of a short-circuit failure, it is likely that the presence or absence of a short-circuit failure of the target switch cannot be determined accurately in case that the lower arm switch has the open-circuit failure. According to the above configuration of the first embodiment, the control unit 31 determines that the target switch has the short-circuit failure on condition that the lower arm switch used to determine the presence or absence of a short-circuit failure is determined not to have the open-circuit failure. It is therefore possible to properly determine the presence or absence of a short-circuit failure with respect to the target switch.

The control unit 31 selects the voltage of the power supply line which is not provided with the target switch among the voltages of the power supply lines L1 to L3, and uses the selected voltage output by the MUX 30 and converted into the digital value. In the above configuration, the control unit 31 can share a conversion unit used to detect the voltage of each power supply line, so the physical size of the control unit 31 and hence the size of the motor driving device 80 can be reduced.

Modification of First Embodiment

It is possible to determine the presence or absence of a short-circuit failure of the target switch without determining the presence or absence of an open-circuit failure of the lower arm. In this case, the processes of steps S13, S14, S18, S19, S23 and S24 in FIG. 5 need not be provided.

Second Embodiment

A second embodiment is different from the first embodiment as described below. In the second embodiment, same structural parts are designated with the same reference numerals for simplification of description.

Since the input voltage Vin to each of the power supply lines L1 to L6 via the first and second pull-up resistor units 40 and 45 decreases as the inter-terminal voltage Vb of the battery 200 decreases, the detection voltage in the absence of a short-circuit failure also decreases. Therefore, in the configuration where the presence or absence of a short-circuit failure of the target switch is determined by comparing the detection voltage with the short-circuit failure determination value TH2, it is likely that the determination result of the presence or absence of a short-circuit failure is adversely affected due to a change in the inter-terminal voltage Vb of the battery 200.

In the present embodiment, the short-circuit failure determination value TH2 used to determine the presence or absence of a short-circuit failure is changed to a smaller value as the inter-terminal voltage Vb of the battery 200 is smaller. Thus, the adverse influence caused by the change in the inter-terminal voltage Vb on the determination of the presence or absence of a short-circuit failure is reduced.

Figure 6:
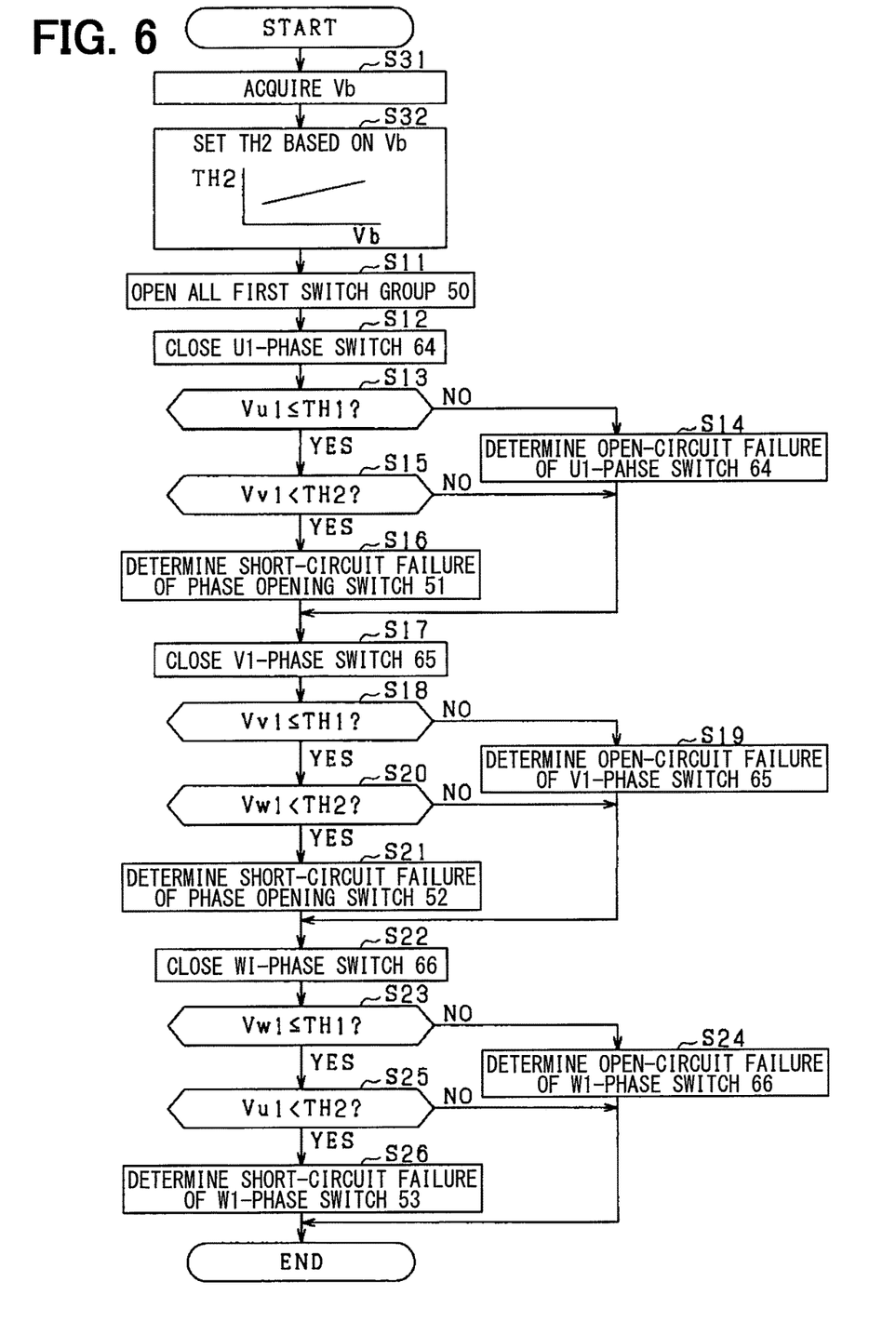
FIG. 6 is a flowchart showing a procedure of determining a short-circuit failure executed by the control unit according to a second embodiment.

FIG. 6 is a flowchart showing a procedure of determining the presence or absence of a short-circuit failure executed in the second embodiment. The process shown in FIG. 6 is repeatedly executed by the control unit 31 in a predetermined cycle period.

In step S31, the inter-terminal voltage Vb of the battery 200 detected by the voltage sensor 21 is acquired.

In step S32, the short-circuit failure determination value TH2 is set based on the inter-terminal voltage Vb acquired in step S31. In the present embodiment, the short-circuit failure determination value TH2 is changed to a smaller value as the inter-terminal voltage Vb decreases. Step S32 corresponds to a threshold value changing unit.

Then, the processing of steps S11 to S26 is executed in the similar manner as described above with reference to the first embodiment (FIG. 5).

In the present embodiment, the short-circuit failure determination value TH2 is changed to a smaller value as the inter-terminal voltage Vb of the battery 200 is smaller. Therefore, it is possible to reduce the adverse influence caused by the change in the inter-terminal voltage Vb on the determination of the presence or absence of a short-circuit failure.

Modification of Second Embodiment

The input voltage Vin supplied to each of the power supply lines L1 to L6 is a value obtained by multiplying the inter-terminal voltage Vb of the battery 200 by a voltage division ratio, which corresponds to the resistance value of the first and second pull-up resistor units 40 and 45. Therefore, even in case that the inter-terminal voltage Vb of the battery 200 changes, the ratio of the detection voltage based on the inter-terminal voltage Vb is constant unless the target switch has a short-circuit failure. Therefore, in the present embodiment, the presence or absence of a short-circuit failure of the target switch may be determined based on the ratio of the detection voltage based on the inter-terminal voltage Vb.

Specifically, instead of setting the short-circuit failure determination value TH2 in step S32 of FIG. 6, each ratio of the detection voltages relative to the inter-terminal voltage Vb acquired at step S31 is calculated as Vu1/Vb, Vv1/Vb and Vw1/Vb, respectively. Then, in step S15, if it is determined that the ratio Vv1/Vb of the detected voltage Vv1 relative to the inter-terminal voltage Vb calculated in step S31 is smaller than a predetermined threshold value, it is determined in step S16 that the U1-phase opening switch 51 is in the short-circuit failure. In step S20, if it is determined that the ratio Vw1/Vb of the detected voltage Vw1 relative to the inter-terminal voltage Vb is smaller than the predetermined threshold value, it is determined in step S21 that the V1-phase opening switch 52 is in the short-circuit failure. In step S25, if it is determined that the ratio Vu1/Vb of the detected voltage Vu1 relative to the inter-terminal voltage Vb is smaller than the predetermined threshold value, it is determined in step S26 that the W1-phase opening switch 53 is in the short-circuit failure.

In the present embodiment, the predetermined threshold value is a value for determining the presence or absence of a short-circuit failure of each phase opening switch 51, 52, 53, and is set to a value larger than 0 but equal to or smaller than 1.

This modification also provides the similar effects as the second embodiment.

Third Embodiment

A third embodiment is different from the first embodiment as described below. In the third embodiment, same structural parts are designated with the same reference numerals for simplification of description.

In the steering system 90, in case that the short-circuit failure of at least either one of the first switch group 50 and the second switch group 55 is determined, it is likely that regenerative current flows from the motor 10 to the inverter via the phase opening switch which has the short-circuit failure. Therefore, in the present embodiment, when the short-circuit failure in the target switch is determined, the control unit 31 executes a fail-safe operation to prohibit the first or second inverter 60 or 70 connected to the switch group 50 or 55 including such a short-circuited target switch, from operating.

Figure 7:
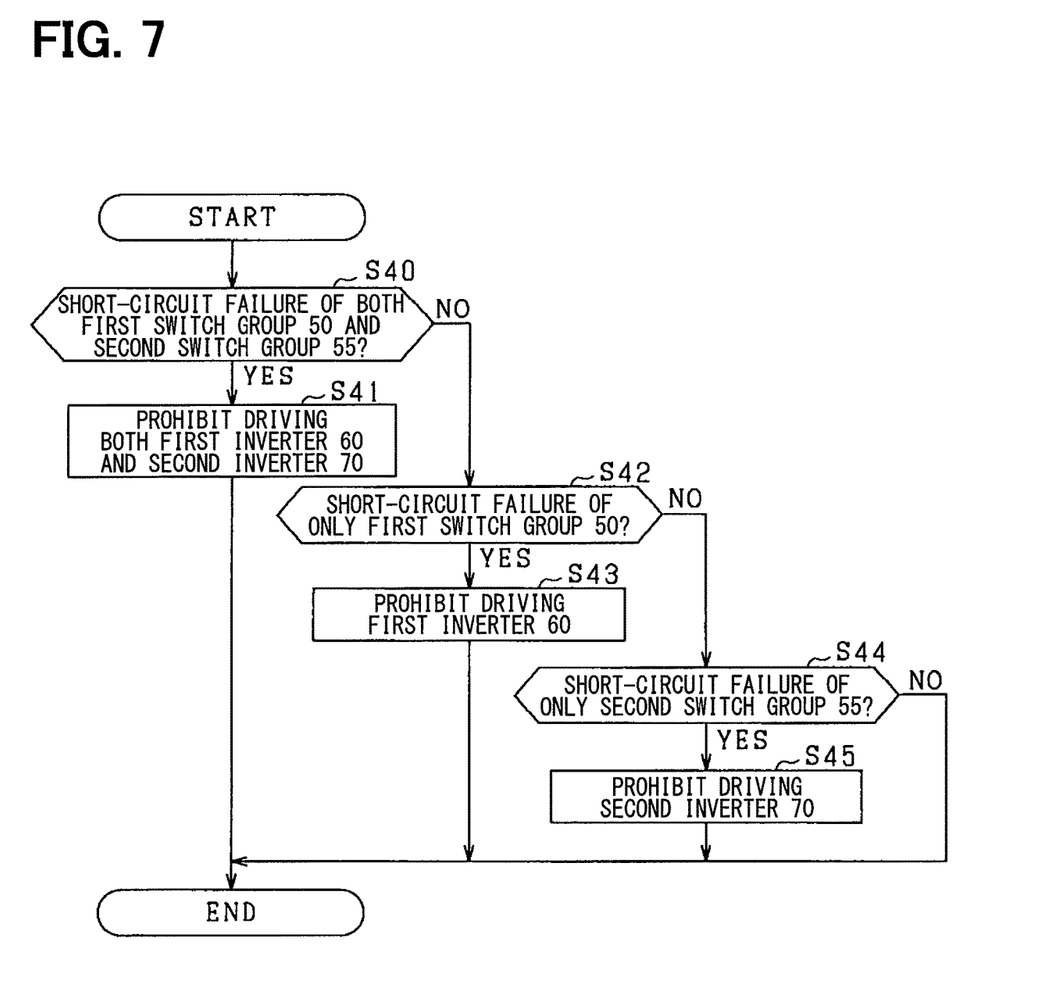
FIG. 7 is a flowchart showing a procedure of fail-safe processing executed by the control unit according to a third embodiment.

FIG. 7 is a flowchart showing the procedure of the fail-safe process performed by the control unit 31 in the present embodiment. The process shown in FIG. 7 is repeatedly executed by the control unit 31 in a predetermined cycle period.

In step S40, it is determined whether both of the first switch group 50 and the second switch group 55 have the short-circuit failure. An affirmative determination is made in step S40 in case that any one of the U1, V1, W1-phase opening switches 51 to 53 of the first switch group 50 and any of the U2, V2, W2-phase opening switches 56 to 58 of the second switch group 55 are determined to be in the short-circuit failure in the short-failure determination process shown in FIG. 5 or FIG. 6.

In case of execution of step S41 following the affirmative determination in step S40, driving of the first and second inverters 60 and 70 is both prohibited to thereby stop power supply to the first and second phase coil groups 11 and 12. By prohibiting the driving of the first and second inverters 60 and 70, the motor 10 does not generate a steering assist torque on the steering shaft 92.

If it is determined that either one of the first and second switch groups 50 and 55 has the short circuit failure or neither of the first and second switch groups 50 and 55 has the short-circuit failure, step S42 is executed thereby to determine whether only the first switch group 50 has the short circuit failure. If it is determined that only the first switch group 50 has the short-circuit failure, step S43 is executed thereby to prohibit the driving of the first inverter 60. In this case, by driving only the second inverter 70, the motor 10 generates a steering assist torque on the steering shaft 92 by only the second phase coil group 12.

If it is not determined in step S42 that only the first switch group 50 has the short circuit failure, step S44 is executed to determine whether only the second switch group 55 has the short-circuit failure. If it is determined that only the second switch group 50 has the short-circuit failure, step S45 is executed thereby to prohibit the driving of the second inverter 70. In this case, by driving only the first inverter 60, the motor 10 generates the steering assist torque on the steering shaft 92 by only the first phase coil group 11.

Steps S41, S43 and S45 correspond to a prohibition unit.

If it is not determined in step S44 that only the second switch group 55 has the short-circuit failure, it results in that none of the first and second switch groups 50 and 55 has the short-circuit failure. Then, the series of processes shown in FIG. 7 is terminated.

In the embodiment described above, the determination result of the presence or absence of a short-circuit failure in the target switch can be used for the failsafe operation of the steering system 90.

Other Embodiment

The control unit 31 may include the MUX 30 therein. In this case, the input terminals of the control unit 31 may be connected to the power supply lines L1 to L6, and the selection of the voltages of the power supply lines L1 to L6 may be performed by the MUX 30 in the control unit 31.

The control unit 31 may include a plurality of A/D conversion units according to the number of input terminals instead of including the MUX 30.

The motor driving device 80 may include only the first inverter 60 instead of the first inverter 60 and the second inverter 70. In this case, the motor 10 may be configured to include only the first phase coil group 11.

The motor driving device 80 is not limited to a steering system of a vehicle, but may be applied to any driving system that performs driving using the motor 10.

What is claimed is:

1. A motor driving device comprising:
an inverter connected to a motor of multiple phases via power supply lines to supply a voltage selectively to the multiple phases of the motor;
phase-opening switches provided in the power supply lines, respectively, for opening and closing a current flow path between the inverter and the motor;
a pull-up resistor circuit connected closer to the inverter than the phase-opening switches in the power supply lines to supply a predetermined voltage from a power supply to the power supply lines;

a short-circuit determination circuit configured to determine a presence or absence of a short-circuit failure of a phase-opening switch, which is to be subjected to a short-circuit failure determination as a target switch; and a voltage detection circuit configured to detect a voltage of each power supply line, wherein the phase-opening switches are configured to supply a current from the inverter to each phase of the motor in an open state thereof;

the short-circuit determination circuit is configured to
  (i) drive all of the phase-opening switches to open,
  (ii) then drive the inverter to electrically connect one of the power supply lines, the one of the power supply lines including the target switch among the phase-opening switches, to a ground by driving a lower arm of the inverter that is connected to the one of the power supply lines to close, wherein the lower arm is connected to the one of the power supply lines including the target switch, and
  (iii) determine that the target switch has the short-circuit failure in case that a target voltage detected by the voltage detection circuit is lower than the predetermined voltage, the target voltage indicating a voltage of a power supply line other than the one of the power supply lines including the target switch, the target voltage being taken at a node between an upper arm and a lower arm of the inverter, which are coupled to the power supply line other than the one of the power supply lines including the target switch.

2. The motor driving device according to claim 1, wherein:
  the power supply is a battery; and
  the short-circuit determination circuit is configured to determine whether the target voltage is smaller than the predetermined voltage by comparing the target voltage with a predetermined threshold value; and
  the short-circuit determination circuit includes a threshold value changing circuit which changes the predetermined threshold value to a smaller value as an inter-terminal voltage of the battery decreases.

3. The motor driving device according to claim 1, wherein:
  the power supply is a battery; and
  the short-circuit determination circuit is configured to determine whether the target voltage is smaller than the predetermined voltage based on a ratio of the target voltage relative to an inter-terminal voltage of the battery.

4. The motor driving device according to claim 1, further comprising:
  an open-circuit failure determination circuit configured to determine whether an open-circuit failure is present in a lower arm of the inverter, the lower arm being connected to the one of the power supply lines including the target switch, wherein
  the short-circuit determination circuit is configured to connect the one of the power supply lines including the target switch, by driving the lower arm to close for determining whether the open-circuit failure is present in the lower arm; and
  the short-circuit determination circuit is configured to determine the short-circuit failure of the target switch on condition that the open-circuit failure determination circuit determines that the lower arm has no open-circuit failure.

5. The motor driving device according to claim 1, wherein the voltage detection circuit includes:
  an output switching circuit configured to select and output the voltage of the power supply line other than the one of the power supply lines including the target switch; and
  a conversion circuit configured to provide the target voltage by A/D converting the voltage outputted from the output switching circuit.

6. A steering system comprising:
  the motor driving device according to claim 1;
  the motor driven by the motor driving device to assist a steering operation in a vehicle by a driving force of the motor, wherein:
  the motor is a multiple winding type motor including a first phase coil group and a second phase coil group;
  the inverter includes a first inverter and a second inverter, which are configured to supply voltages to the first phase coil group and the second phase coil group;
  a first switch group provided as the phase-opening switches for connecting the first inverter and the first phase coil group;
  a second switch group provided as the phase-opening switches for connecting the second inverter and the second phase coil group; and
  a prohibition circuit configured to prohibit an operation of one inverter between the first inverter and the second inverter connected to one of the first switch group or the second switch group which is determined to have the short-circuit failure, when the short-circuit determination circuit determines that either one of the first switch group and the second switch group has the short-circuit failure.

7. The motor driving device according to claim 1, wherein the voltage detection circuit comprises a multiplexer, the multiplexer electrically connected to each of the power supply lines, the multiplexer configured to select and output the voltage of the power supply line other than the one of the power supply lines including the target switch.

8. A motor driving device for a motor of multiple phases which are supplied with a voltage from a power supply through an inverter and power supply lines connecting the inverter and provided in correspondence to the multiple phases, the motor driving device comprising:
  phase-opening switches provided in the power supply lines between the inverter and the motor, respectively;
  a resistor circuit connecting the power supply lines to the power supply;
  a voltage detection circuit connected to the power supply lines to detect a voltage of each of the power supply lines; and
  a control circuit configured to determine a short-circuit failure of the phase-opening switches, wherein the control circuit is configured to:
    open all of the phase-opening switches to interrupt electric connection of the motor to the inverter and the resistor circuit;
    electrically connect only one power supply line among the power supply lines to a ground by driving a lower arm of the inverter that is connected to the one of the power supply lines to close, wherein the lower arm is connected to the one power supply line, and the one power supply line includes a target switch among the phase-opening switches;
    compare a voltage of another power supply line among the power supply lines with a predetermined value; and determine a short-circuit failure of one phase-opening switch provided in the one phase-opening switch when the voltage of the another power supply line is smaller than the predetermined value, the voltage of the another power supply line indicating a voltage of a power supply line other than the one power supply line, the voltage being taken at a node between an upper arm and a lower arm of the inverter, which are coupled to the another power supply line.

9. The motor driving device according to claim 8, wherein the control circuit is configured further to:

compare the voltage of the one power supply line with a threshold value; and determine an open-circuit failure indicating that the one power supply line is not connected to the ground when the voltage of the one power supply line is larger than the threshold value.

10. The motor driving device according to claim 9, wherein:

the control circuit is configured to determine the short-circuit failure of the one phase-opening switch on condition of no determination of the open-circuit failure.

11. The motor driving device according to claim 8, wherein:

the control circuit is configured to change the predetermined value in correspondence to an inter-terminal voltage of the power supply.

12. The motor driving device according to claim 8, further comprising a multiplexer, the multiplexer electrically connected to each of the power supply lines, the multiplexer configured to select and output the voltage of the power supply line other than the one of the power supply lines including the target switch.

* * * * *